US006523243B2

(12) United States Patent
Phillips et al.

(10) Patent No.: US 6,523,243 B2
(45) Date of Patent: Feb. 25, 2003

(54) APPARATUS AND PROCESS FOR BORING AND BOLTING PALLETS

(75) Inventors: Ned H. Phillips, Elkins, WV (US); Michael L. Helmick, St. George, WV (US)

(73) Assignee: Hinchcliff Lumber Company, Parsons, WV (US)

( * ) Notice: Subject to any disclaimer, the term of this patent is extended or adjusted under 35 U.S.C. 154(b) by 43 days.

(21) Appl. No.: 09/817,433

(22) Filed: Mar. 26, 2001

(65) Prior Publication Data

US 2001/0034930 A1 Nov. 1, 2001

Related U.S. Application Data

(60) Provisional application No. 60/191,919, filed on Mar. 24, 2000.

(51) Int. Cl.[7] .......................... B23P 19/00; B23P 21/00; B23B 41/00

(52) U.S. Cl. ........................ 29/464; 29/772; 29/525.02; 29/33 K; 29/33 R; 108/56.3; 408/1 R; 144/93.1

(58) Field of Search ..................... 29/772, 464, 525.02, 29/33 K, 564.1, 564.7, 33 R; 108/56.3, 56.1, 57.17, 57.33; 144/92, 93.1; 408/1 R

(56) References Cited

U.S. PATENT DOCUMENTS

| | | | | | |
|---|---|---|---|---|---|
| 3,046,558 | A | * | 7/1962 | Hadnagy | 227/139 |
| 3,835,791 | A | * | 9/1974 | Brown | 29/432 |
| 3,941,291 | A | * | 3/1976 | Hayworth | 227/130 |
| 5,095,605 | A | * | 3/1992 | Tonus | 29/464 |
| 5,249,352 | A | * | 10/1993 | Landers | 29/772 |
| 6,015,247 | A | * | 1/2000 | Branaman | 29/466 |

* cited by examiner

*Primary Examiner*—A. L. Wellington
*Assistant Examiner*—Erica E Cadugan
(74) *Attorney, Agent, or Firm*—Steptoe & Johnson PLLC

(57) ABSTRACT

The method for boring and bolting pallets comprises filling an assembly jig located at a pre-boring station with the components to form an incomplete pallet; simultaneously boring the intersections of the incomplete pallet by raising a plurality of drills to the incomplete pallet, thereby creating a bored pallet; delivering the assembly jig containing the bored pallet form to a bolting table; and bolting together the components of the bored pallet form into a pallet.

3 Claims, 8 Drawing Sheets

APPARATUS AND PROCESS FOR BORING AND BOLTING PALLETS

CROSS-REFERENCE TO RELATED APPLICATIONS

This application claims priority from U.S. provisional application No. 60/191,919 filed on Mar. 24, 2000.

BACKGROUND OF THE INVENTION

1. Field of the Invention

This invention relates to methods for making pallets, and more particularly, to a method and apparatus for boring and bolting pallets.

2. Related Art

Wooden pallets for transporting and storing goods are widely used in commerce and industry. Due to heavy loads and rough handling, pallets are frequently destroyed or damaged and generally have a relatively short useful life. Therefore, a continuous supply of substantial quantities of new replacement pallets is needed in industries which involve bulk storage and handling operations.

Conventional pallets have a plurality of wooden components that are nailed or bolted together. Such conventional bolted pallet construction processes require each component of a pallet to be drilled separately, then the pallet is assembled using bolts at a later date. Problems arise with the assembly in that the holes in joining components may or may not align properly. If mis-aligned, the edges of the components of the resulting pallet will not be flush. Moreover, even if one could drill the holes in exactly the right location it would be very time consuming to line up all of the parts and holes so as to bolt the parts together with proper alignment.

Therefore, there is a need for an apparatus and process in which a wooden pallet is drilled quickly and efficiently such that when bolted together, all joining components of the pallet are aligned properly resulting in flush edges.

In addition, conventional bolted pallets use step drills for drilling the bores in the pallet. Step drills are known in the prior art and are commercially available; however, such step drills only have two diameters. Therefore, the resulting bore from a conventional step drill does not provide a means for making the head of a bolt recessed within, or flush with, a panel top component. By only providing a bore with two diameters, the head of a bolt must rest on the top surface of a panel top component. Therefore, when moving a pallet, the head of the bolt will catch on objects and make it difficult to slide or move a pallet in and out of different positions.

Therefore, there is a need for an apparatus and process in which the bores of a pallet are drilled having three diameters, thereby allowing the head of a bolt to be recessed in, or flush with, the top surface of a panel top component of the pallet.

SUMMARY OF THE INVENTION

The present invention solves the problems encountered with previous efforts at manufacturing bolted pallets by providing a method and apparatus that can quickly position pallet components in an assembly jig, drill bores through joining components simultaneously, and keep the components in place while the pallet is bolted together.

The apparatus for boring and bolting pallets includes a means for loading an assembly jig with two or more main components, two or more cross components, a plurality of spacer support components, and a panel top component (collectively, components). The assembly jig holds the main components, cross components, spacer support components, and panel top component in proper position to form an incomplete pallet. The apparatus also includes a means for simultaneously boring each intersection of a main component, spacer support component, cross component, and panel top component of the incomplete pallet while the incomplete pallet is being contained in the assembly jig. The boring of the components is accomplished by raising a plurality of drills from below the incomplete pallet. After drilling the bores from below, the assembly jig contains a bored pallet wherein all of the needed bores have been drilled concurrently. The apparatus also includes a means for delivering the assembly jig containing the bored pallet to a bolting table where the main components are bolted to the cross components, the spacer support components, and the panel top component, resulting in a bolted pallet or pallet. Once the pallet is removed from the assembly jig, the apparatus can include a means for returning the assembly jig to the means for loading in order to receive new components for a new pallet.

The method for boring and bolting pallets includes filling an assembly jig located at a pre-boring station with two or more main components, two or more cross components, a plurality of spacer support components, and a panel top component to form an incomplete pallet; simultaneously boring the intersections of the main components, the cross components, the spacer support components, and the panel top component of the incomplete pallet, resulting in a bored pallet form; delivering the assembly jig containing the bored pallet form to a bolting table; and bolting all of the components together to create a pallet. The method can also include means for removing the pallet from the assembly jig, and a means for returning the assembly jig to the pre-boring station in order to receive new components for a new pallet.

The present invention uses a drill bit having three different diameters, resulting in a bore having corresponding three different diameters. This provides the means for the head of the bolts to be recessed in, or flush with, the exterior surface of the pallet. The advantage of recessed bolts is that the pallet can be easily slid into position without the bolt heads catching on anything and interfering with the moving of the pallet.

As a result of the boring and bolting process, a pallet is produced that has two or more main components, two or more cross components, and a panel top component, thereby creating four or more intersections of the main components, the cross components, and spacer support components. The pallet has a bore centrally located at each of the main component/cross/spacer support component intersections with a bolt inserted through each bore. Each bolt is secured with a pallet nut such that the head of the bolt and the pallet nut are countersunk below the exterior surface of the pallet.

An advantage of the present invention is that the external edges of the pallet are flush—meaning that the panel top component, cross components, spacer support components, and main components are flush with one another such that no one component protrudes beyond any of the others. This can be done without grossly over-sizing the bores which makes the joints of the pallet loose and weak.

A second advantage of the present invention is that all bores of a pallet are drilled simultaneously and with precision resulting in a pallet being assembled quickly and efficiently because all components are automatically aligned. In operation, it has been shown that the present invention results in more pallets being made in fewer man hours, thereby reducing the labor cost of pallet construction.

BRIEF DESCRIPTION OF FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Figure 1:
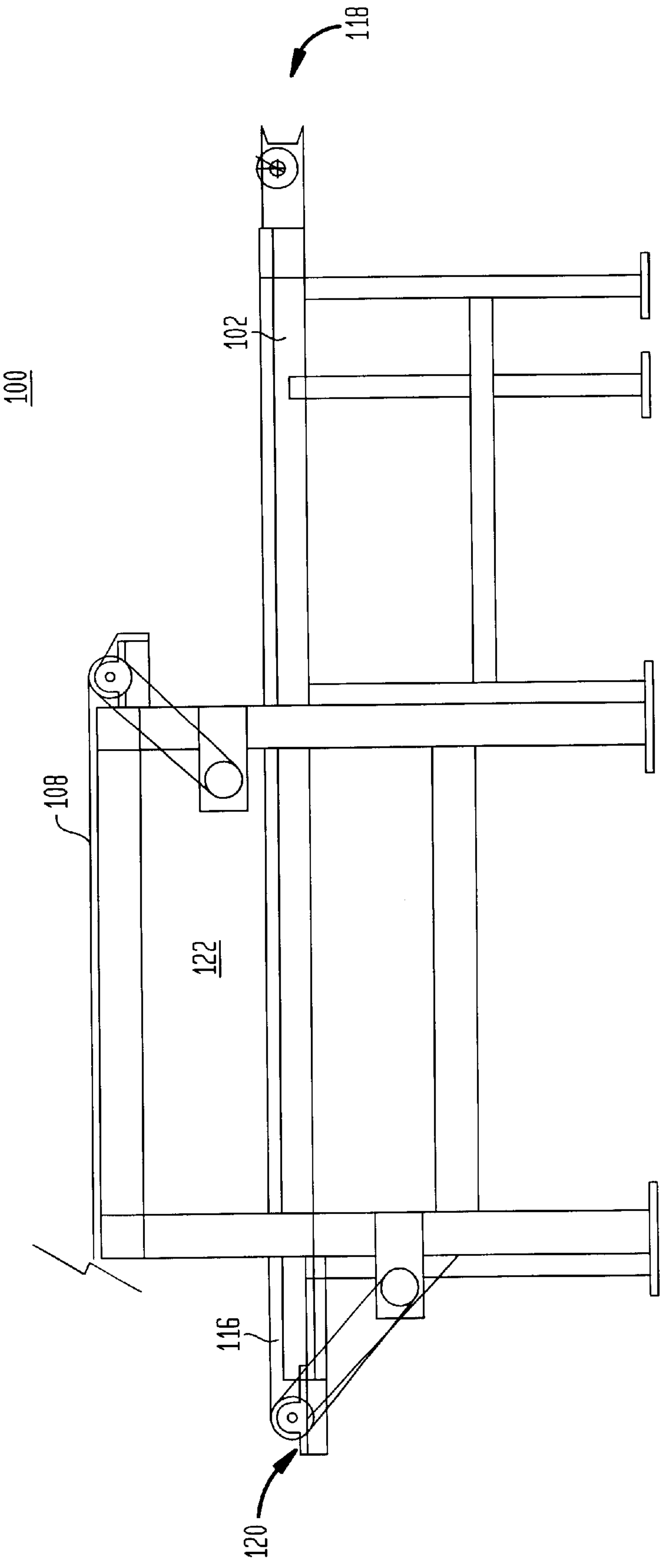
FIG. 1 is a planar diagram showing a side view of a boring machine of the present invention.
Figure 2:
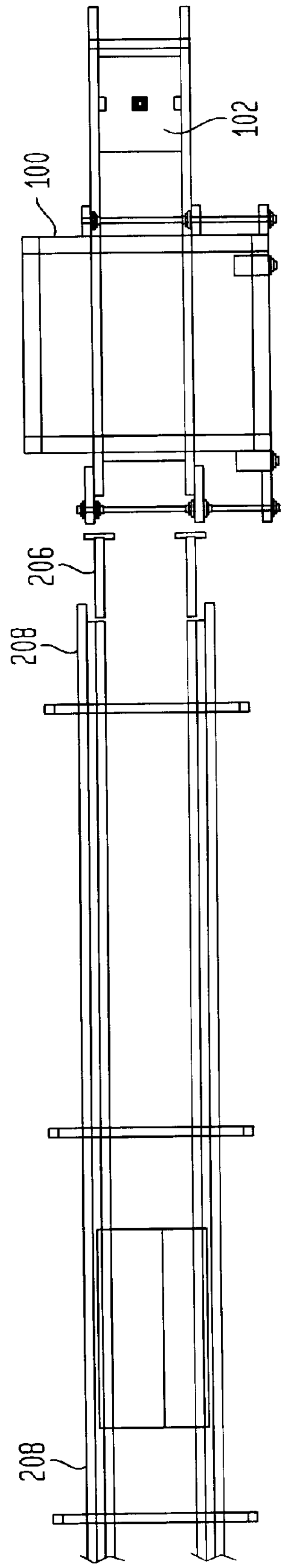
FIG. 2 is a planar diagram showing a top view of the apparatus of the present invention for manufacturing pallets.
Figure 3A:
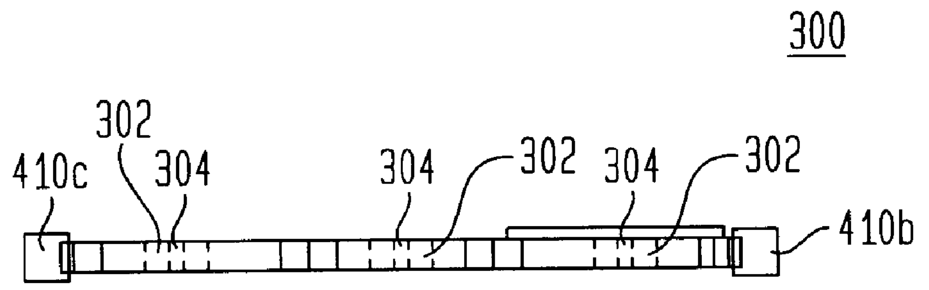
FIG. 3A is a planar diagram showing a side view of a boring machine table of the present invention.
Figure 3B:
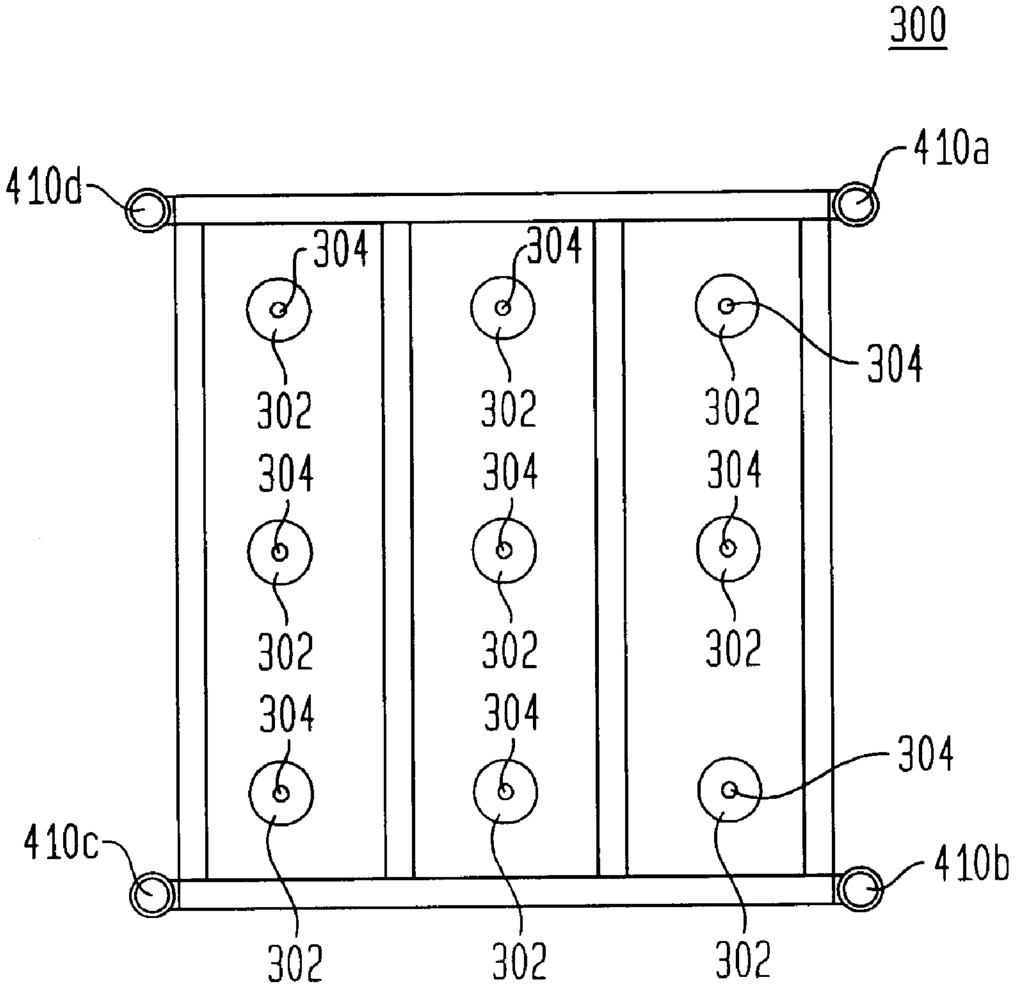
FIG. 3B is a planar diagram showing a bottom view of the boring machine table.
Figure 4A:
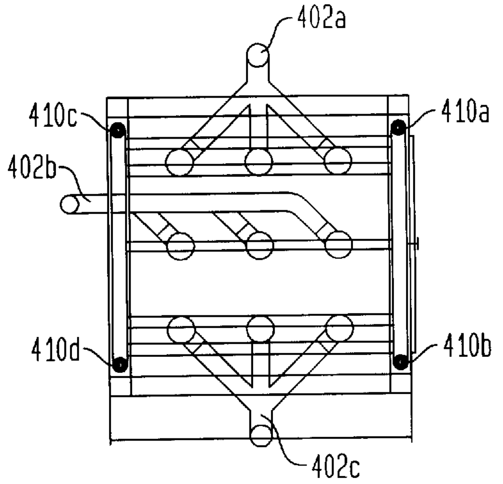
FIG. 4A is a planar diagram showing a bottom view of the boring machine table with a dust collector system of the present invention.
Figure 4C:
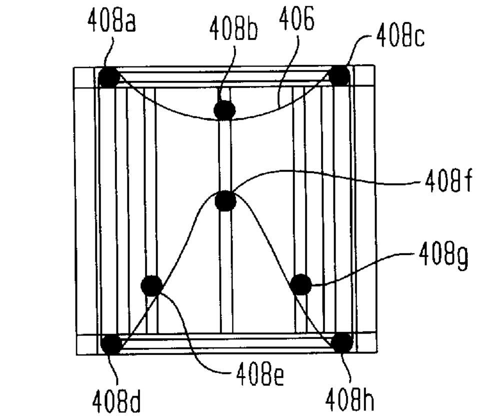
FIG. 4C is a planar diagram showing a bottom view of the boring machine table with a lift assembly of the present invention.
Figure 4B:
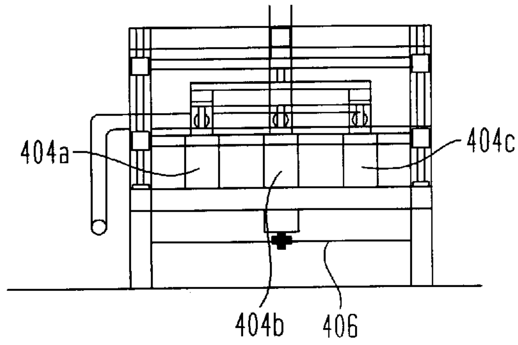
FIG. 4B is a planar diagram showing a side view of the boring machine with a motor system.
Figure 4D:
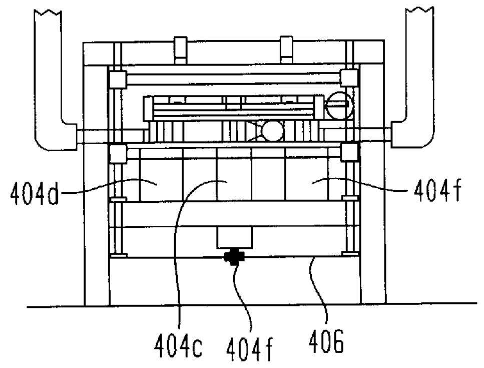
FIG. 4D is a planar diagram showing a front view of the boring machine with the dust collector system and the motor system.

FIGS. 1–9 show the preferred method and apparatus for manufacturing bolted pallets wherein all of the components of the pallet are bored and bolted at one time.

In the preferred embodiment, an operator loads an assembly jig (or jig) 600 with a plurality of components. In the preferred embodiment, the components comprise at least two main components 818 (bottom boards), and at least two cross components 816 (connectors), wherein a spacer support component 812 (block) is inserted between each main component 818 and each cross component 816 at every intersection. Furthermore, a panel top component (overlay) 814 of panel board or other material known to one of ordinary skill in the art is placed over the cross components 816. See FIG. 8. The preferred components are described in these terms for convenience purpose only. It would be readily apparent for one of ordinary skill in the relevant art to use the present invention in constructing a pallet having only two or more main components 818 and two or more cross components 816, and optionally including any additional component, e.g., a spacer support component 812 or a panel top component 814.

In the preferred embodiment, a pallet of the present invention is manufactured of all wood pieces; however, this is for convenience purpose only. It would be readily apparent to one of ordinary skill in the relevant art to use the present invention with a pallet of a different material, e.g., plywood, oriented strand board, plastic, composite materials, or a combination thereof.

An assembly jig 600 of the present invention has four walls, e.g. a first wall 602 and a second wall 606, which may by dynamically adjustable to accommodate a pallet of any size. In addition, the assembly jig 600 has a locking bar 604 for holding the components in place within the assembly jig 600. In operation, the locking bar 604 is raised. Once the components are inserted in the assembly jig 600, the locking bar 604 is lowered, thereby clamping the components in position.

Also for convenience only, when an operator properly "loads" an assembly jig 600 with main components 818, cross components 816, spacer support components 812, and a panel top component 814 (collectively, components), an incomplete pallet is created and contained in the assembly jig 600. After the bores 806 are drilled through the components at each intersection, a bored pallet 800 is created and contained in the assembly jig 600. After the bolts are inserted and fastened through each bore 806, a pallet is created and removed from the assembly jig 600.

Figure 8A:
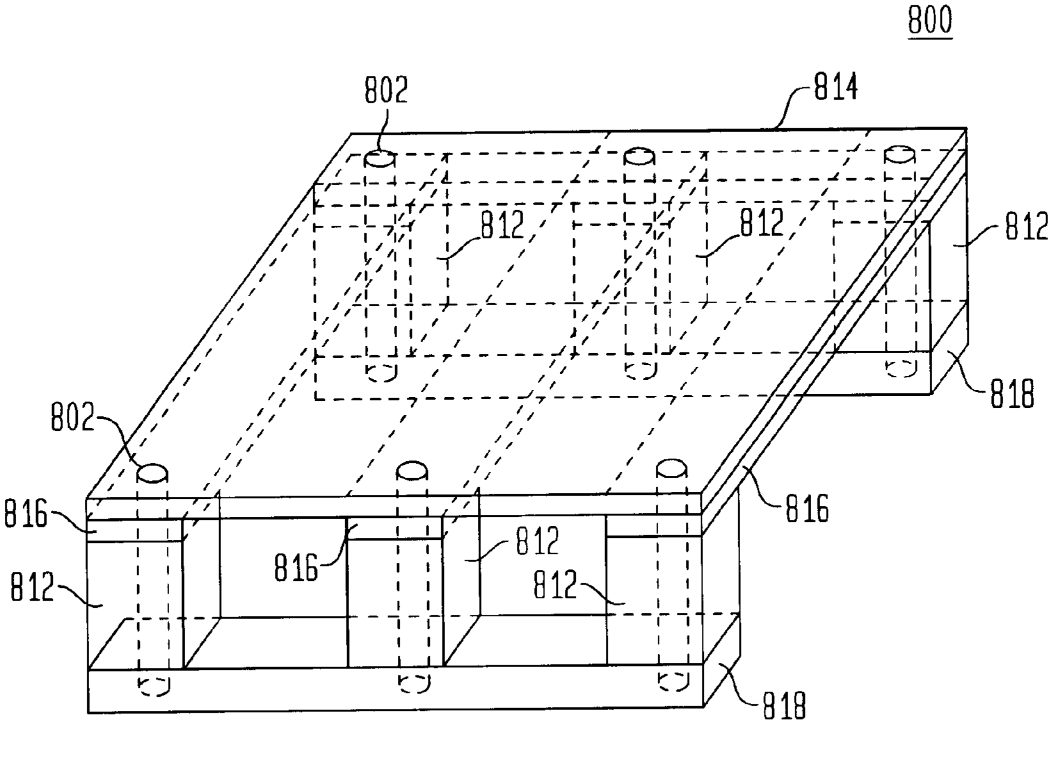
FIG. 8A is a perspective diagram of a bored pallet of the present invention.
Figure 8B:
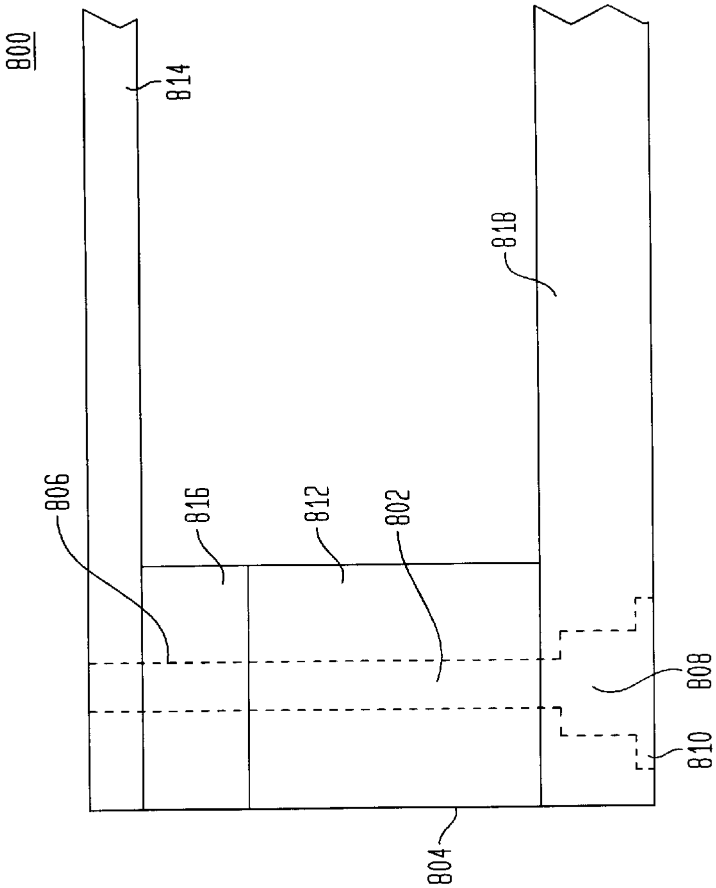
FIG. 8B is a planar diagram showing the cross-section of an intersection of a bored pallet.
Figure 9:
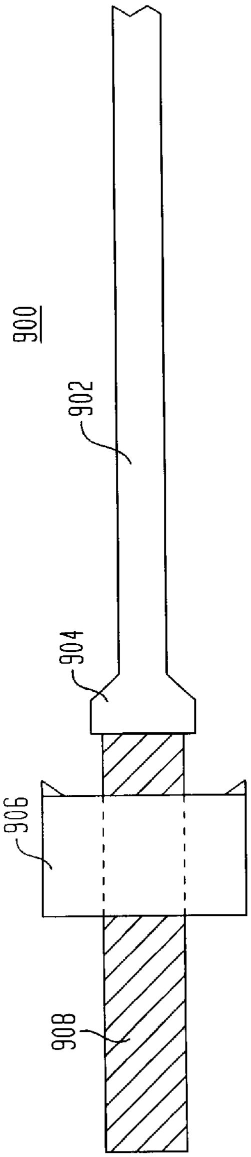
FIG. 9 is a planar diagram showing a drill bit of the present invention.

FIG. 8B is a cross section of an intersection of a bored pallet 800 of the present invention, showing the preferred shape of a bore 806. In the preferred embodiment, the bore 806 of the present invention has three different diameters: ⅜", 9/16", and 1⅛". This preferred bore 806 is made using a preferred drill bit 900 of the present invention as shown in FIG. 9, wherein the drill bit 900 provides the three different diameters. The drill bit 900 comprising a first bit means 902 for creating a bore 806 having a first diameter, e.g., ⅜", a second bit means 904 for creating a bore 806 having a second diameter, e.g., 9/16", and a third bit means 906 for creating a bore 806 having a third diameter, e.g., 1⅛". The third diameter of the bore 806 is made by rigidly attaching, such as by using two or more screws, a third bit means 906 to the shaft 908 of the drill bit 900. Therefore, when the drill bit 900 engages an intersection of an incomplete pallet, the first bit means 902 makes a first diameter portion 802 of the bore 806, the second bit means 904 makes a second diameter portion 808 of the bore 806, and the third bit means 906 makes a third diameter portion 810 of the bore 806. It is the second diameter portion 808 and third diameter portion 810 that allow a pallet nut to be recessed below the exterior surface of the pallet 800.

A preferred embodiment of a boring machine 100 of the present invention for simultaneously boring holes 806 into all of the intersections between main components 800 and cross components 816 of an incomplete pallet is shown in FIG. 1. The boring machine 100 has a means for receiving an empty assembly jig 600, a means for loading the empty assembly jig 600 with components to create an incomplete pallet, a means for simultaneously boring the bores 806 in an incomplete pallet to create a bored pallet 800, a means for delivering the bored pallet 800 to a bolting table 500 where a bolter installs a bolt into each bore 806 in the bored pallet 800. Also, in the preferred embodiment, the present invention includes a means for returning an empty assembly jig 600 once a bolter removes the pallet from the assembly jig 600.

The preferred means for receiving an empty assembly jig 600 comprises an upper, or second, conveyor system 108 positioned above the boring machine 100 which moves in a horizontal plane longitudinally towards an operator standing at the loading end 118 of the boring machine 100. When needed, the operator advances an empty assembly jig 600 from the upper conveyor system 108 on to a vertically adjustable table 102 that is in the raised position such that the table 102 is aligned with the upper conveyor system 108. The operator then lowers the vertically adjustable table 102 with the assembly jig 600 disposed thereon to a lower, or first, conveyor system 116. The lower conveyor system 116 moves in a horizontal plane longitudinally toward the rear end 120 of the boring machine 100.

A means for loading the empty assembly jig 600 with components to create an incomplete pallet comprises the vertically adjustable table 102 of the boring machine 100 on which an empty assembly jig 600 rests while being loaded with components. Once an operator has installed all of the components and makes an incomplete pallet, and the drilling portion 122 of the boring machine 100 is empty, the operator engages the lower conveyor system 116 to move the incomplete pallet into the drilling portion 122.

In the preferred embodiment, a means for simultaneously boring the bores 806 in an incomplete pallet to create a bored pallet comprises nine (9) drill bits 900 that drill bores 806 into the incomplete pallet, one in each intersection, from underneath the incomplete pallet. That is, a boring machine table 300, having nine motors 404, showing only a subset of motors 404*a–f* for convenience purpose only, attached thereto wherein each motor 404 is coupled to a drill bit 900, is raised from under the assembly jig 600 such that each drill bit 900 drills a bore 806 into an intersection of the incomplete pallet. Specifically, a drill bit 900 raises through a hole 304 in the boring machine table 300 wherein a motor 404 is mounted to a motor mounting 302 on the bottom of the boring machine table 300.

In the preferred embodiment, a motor 404 is a 2 horsepower C-face motor and the boring machine table 300 is a 1" thick machined steel table. Also in the preferred embodiment, the process for boring the incomplete pallets takes about four passes of the drill bits 900 to make a bore 806 of the needed shape and dimensions. The boring machine table 300 is raised and lowered by a system using a plurality of threaded rods 410*a–d*, one in each corner of the boring machine table 300, which are connected via a chain 406 and one or more sprockets 408. A hydraulic motor approximately centered underneath the boring machine table 300 drives the sprocket 408*f* which in turn moves the chain 406, thereby turning the threaded rods 410*a–d* and moving the boring machine table 300 up and down. FIG. 8B shows a profile of a single bore 806 for convenience purpose only. The discussion pertaining to the drilling of a single bore 806 is equally applicable to all bores 806 drilled into an incomplete pallet.

The present invention is described in these terms for convenience purpose only. It would be readily apparent for one of ordinary skill in the relevant art to use a comparable motor 404, drill bit 900, and system for raising and lowering the boring machine table 300.

In the preferred embodiment, the boring machine 100 also incorporates a dust collection system comprising a plurality of tubes 402 connected to a vacuum system such that as the drilling machine 100 bores the bores 806, the tubes 402 collect some of the resulting dust and shavings from the drilling process.

A means for delivering the assembly jig 600 containing a bored pallet to a bolting table 500 where two bolters install bolts into each bore 806 in the bored pallet comprises a first conveyor system 208. A means for returning an empty assembly jig 600 once the bolters remove the pallet from the assembly jig comprises a second conveyor system 206, wherein the first conveyor system 208 and the second conveyor system 206 are vertically separated by about 12 inches. In operation, the bolters move the assembly jig 600 with the bored pallet off the first conveyor system 208 and onto the bolting table 500.

Figure 5A:
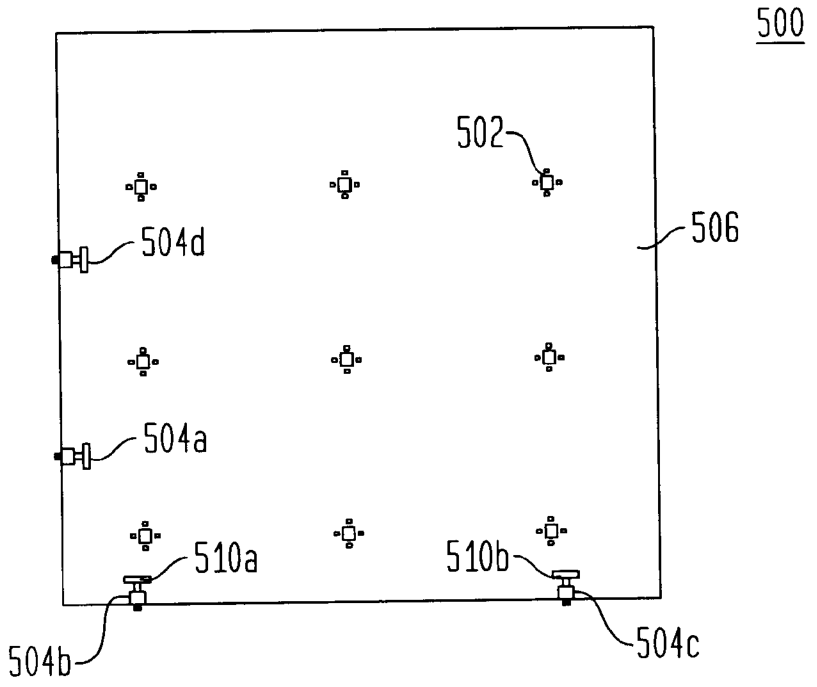
FIG. 5A is a planar top view of a bolting table of the present invention.
Figure 5B:
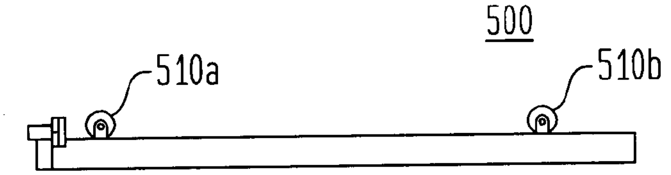
FIG. 5B is a planar front view of the bolting table.
Figure 5C:
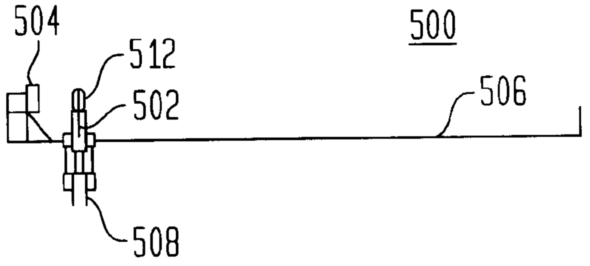
FIG. 5C is a planar side view of the bolting table.
Figure 6A:
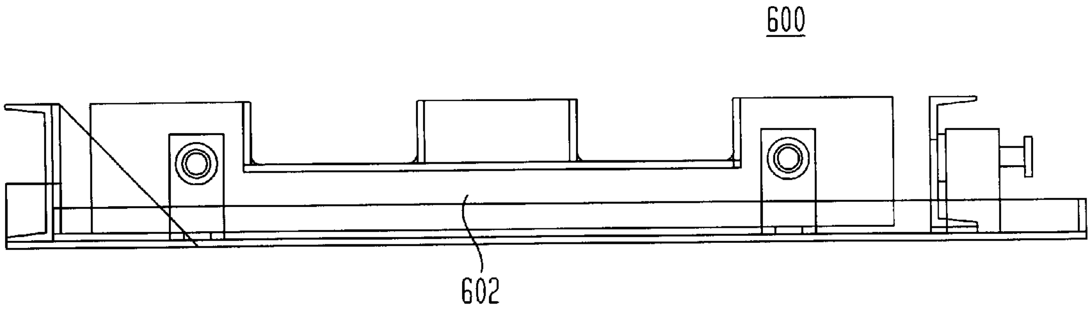
FIG. 6A is a planar side view of an assembly jig of the present invention.
Figure 6B:
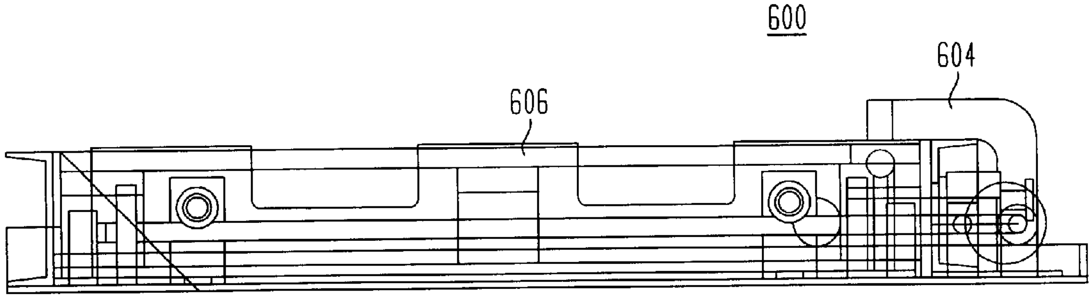
FIG. 6B is a planar front view of the assembly jig.
Figure 7:
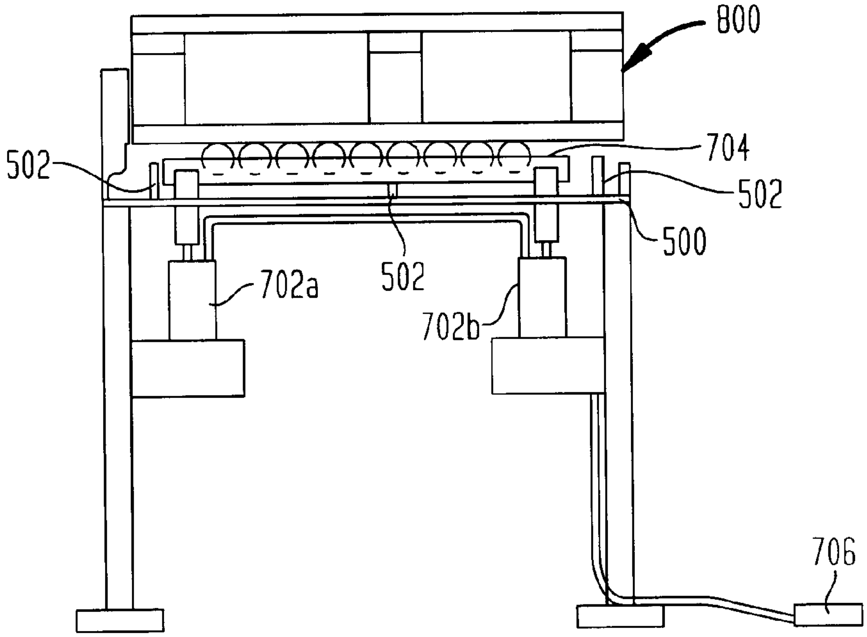
FIG. 7 is a planar side view of the bolting table showing the raising/lowering assembly.

In the preferred embodiment, the bolting table 500 has a recessed table face 506 that is generally rectangular in shape with nine (9) hex-shaped blades 502 extending upwards off the table face 506. The nine (9) hex-shaped blades 502 are configured such that they align with the nine (9) bores 806 in the bored pallet. Prior to the bolters moving the assembly jig 600 containing the bored pallet onto the bolting table 500. the bolters place a Dynacast pallet nut onto each blade 502. Therefore, when the assembly jig 600 with the bored pallet is moved onto the bolting table 500, each of the nine pallet nuts is properly positioned under a bore 806 of the bored pallet. The bolting table 500 also comprises a means for aligning 504 an assembly jig 600 containing a bored pallet on the top of the bolting table 500. The means for aligning 504 allows the assembly jig 600 to easily roll off of the first conveyor system 208 via wheels 510*a, b* and align the bores 806 of the bored pallet directly over the hex-shaped blades 502 with pallet nuts. In the preferred embodiment the means for aligning are a plurality of stops 504*a–d*. The position of the stops 504*a–d* on the bolting table 500 may or may not be adjustable to accommodate pallets of varying sizes. For convenience purpose only, FIG. 5C shows a single hex-shaped blade 502 extending through the bolting table 500 with a pallet nut 512 disposed thereon.

The bolting table 500 also comprises a means for raising and lowering the assembly jig 600 containing the bored pallet 800 so as to insert the nine pallet nuts into the bores 806 in the bored pallet 800. See FIG. 7 wherein the assembly jig 600 is not shown for convenience purpose only. In the preferred embodiment, the means for raising and lowering the assembly jig 600 comprises four air cylinders 702*a,b* and two (2) sets of rollers 704 that support the assembly jig 600 and bored pallet 800. Once the assembly jig 600 with the bored pallet 800 is in place on the bolting table 500, a bolter operates a foot petal 706 for engaging the air cylinders 702 in order to lower the assembly jig 600 and the bored pallet 800 onto the bolting table 500, thereby inserting the pallet nuts into the bores 806 of the bored pallet 800.

The hex-shaped blades 502 of the bolting table 500 also provide a means for preventing the pallet nuts from rotating while a bolt is being installed from above. That is, after the pallet nuts are inserted into the bores 806, the bolters place a bolt into each bore 806 and use air impact wrenches to tighten the bolt through the bore 806 and into the pallet nut. In the preferred embodiment, the means for preventing the pallet nuts from rotating is the hex-shaped blades 502. Because the blades 502 are hex-shaped, they fit within the hex-shaped holes of the pallet nuts, thereby immobilizing them and preventing their rotation, as a bolt is inserted and tightened.

Once the nine (9) bolts are inserted and tightened in the nine (9) bores 806 of the bored pallet, the bolter operates the foot pedal 706 a second time, thereby engaging the air cylinders 702*a,b* to raise the assembly jig 600 containing a complete pallet above the hex-shaped blades 502. Therefore, the air cylinders 702*a, b* provide the means for raising and lowering the assembly jig 600 above the hex-shaped blades 502. The bolters then remove the pallet from the assembly jig 600 and place the empty assembly jig 600 on the second conveyor system 206 for return to the boring machine 100.

CONCLUSION

While various embodiments of the present invention have been described above, it should be understood that they have been presented by the way of example only, and not limitation. It will be understood by those skilled in the art that various changes in form and details may be made therein without departing from the spirit and scope of the invention as defined. Thus, the breadth and scope of the present invention should not be limited by any of the above-described exemplary embodiments.

What is claimed is:

1. A method of boring and assembling a bolted pallet having two or more components and two or more cross components, resulting in four or more intersections of the main components and the cross components, comprising the steps of:

(a) filling an assembly jig located at a pre-boring station with two or more of the main components and two or more of the cross components to form an incomplete pallet;

(b) simultaneously boring the intersections of the main components and the cross components of said incomplete pallet, resulting in a bored pallet;

(c) delivering said assembly jig containing said bored pallet to a bolting table, and (d) bolting the main components to the cross components of said bored pallet, resulting in the bolted pallet.

2. The method of boring and assembling a bolted pallet according to claim 1, further comprising the steps of:

(e) removing the bolted pallet from said assembly jig; and (f) returning said assembly jig to said pre-boring station.

3. The method of boring and assembling a bolted pallet according to claim 1, wherein said step (b) bores the intersections from the bottom of said incomplete pallet.

* * * * *